(12) United States Patent
Ishii

(10) Patent No.: US 8,215,442 B2
(45) Date of Patent: Jul. 10, 2012

(54) REAR MOUNT STRUCTURE OF ENGINE

(75) Inventor: Takaaki Ishii, Shizuoka-ken (JP)

(73) Assignee: Suzuki Motor Company, Hamamatsu-shi (JP)

( * ) Notice: Subject to any disclaimer, the term of this patent is extended or adjusted under 35 U.S.C. 154(b) by 370 days.

(21) Appl. No.: 12/590,962

(22) Filed: Nov. 17, 2009

(65) Prior Publication Data

US 2010/0170738 A1    Jul. 8, 2010

(30) Foreign Application Priority Data

Jan. 7, 2009  (JP) .................... 2009-001521

(51) Int. Cl.
  *B60K 1/00*      (2006.01)
  *B60K 3/00*      (2006.01)
(52) U.S. Cl. ........................ 180/292; 180/291
(58) Field of Classification Search ............. 180/291, 180/292
  See application file for complete search history.

(56) References Cited

U.S. PATENT DOCUMENTS

| | | | | |
|---|---|---|---|---|
| 2,963,106 A * | 12/1960 | Sampietro | ........... | 180/379 |
| 3,759,341 A * | 9/1973 | Takeda | ........... | 180/292 |
| 3,913,696 A * | 10/1975 | Kennedy et al. | ........... | 180/292 |
| 5,036,943 A * | 8/1991 | Kashiwagi | ........... | 180/380 |
| 5,267,623 A * | 12/1993 | Kashiwagi | ........... | 180/58 |
| 5,372,399 A * | 12/1994 | Ito et al. | ........... | 180/89.17 |
| 5,758,738 A * | 6/1998 | Carroll et al. | ........... | 180/292 |
| 5,813,491 A * | 9/1998 | Sato et al. | ........... | 180/309 |
| 6,415,884 B1 * | 7/2002 | Hawener et al. | ........... | 180/291 |
| 6,910,547 B1 * | 6/2005 | Piech et al. | ........... | 180/291 |
| 7,364,002 B2 * | 4/2008 | Mabuchi et al. | ........... | 180/291 |
| 7,575,087 B2 * | 8/2009 | Kim | ........... | 180/291 |
| 7,779,957 B2 * | 8/2010 | Mitake | ........... | 180/291 |

FOREIGN PATENT DOCUMENTS

| | | |
|---|---|---|
| JP | 56-086823 | 7/1981 |
| JP | 60-48361 | 10/1985 |
| JP | 1-126885 | 8/1989 |

\* cited by examiner

*Primary Examiner* — J. Allen Shriver, II
*Assistant Examiner* — James M Dolak
(74) *Attorney, Agent, or Firm* — Flynn, Thiel, Boutell & Tanis, P.C.

(57) ABSTRACT

A seat front member and a seat rear member are connected to each other through left and right seat rails. The seat front member and the seat rear member are disposed on an upper surface of a floor panel. An outer end of a bracket is joined to an inner side of a side frame and an upper end of the bracket is joined to the under surface of the floor panel. The bracket is disposed on a region wherein, the bracket is sandwiched between the seat front member and the seat rear member. A lower surface of the bracket is disposed a higher distance from the ground than a lower surface of the side frame. A rear mount member is rigidly coupled to a lower surface of the bracket and a lower surface thereof is disposed at a higher distance from the ground than the side frame.

2 Claims, 5 Drawing Sheets

REAR MOUNT STRUCTURE OF ENGINE

BACKGROUND OF THE INVENTION

1. Field of the Invention

The present invention relates to a rear mount structure of an engine, and more particularly, to a rear mount structure of an engine for fixing a rear mount member.

2. Description of the Related Art

In a vehicle, as shown in FIG. 6, when an engine 108 of a power train 107 to be mounted is of a longitudinal layout, a pitch mount type in which the power train 107 is supported at three locations, i.e., a right mount portion 112 and a left mount portion 113 of the engine 108 and a rear mount portion 114 at a rear end of a transmission 109 is employed in some cases. In this case, a rear mount member 115 is required for supporting the rear mount portion 114. It is necessary that the rear mount member 115 is of a structure that is not easily vibrated. To prevent a vibration from being transmitted to a vehicle body, the rear mount member 115 is generally mounted on lower portions of a pair of side frames which are disposed on both sides of the vehicle in its widthwise direction and which form a framework of the vehicle body.

According to a vehicle body structure of an automobile concerning the rear mount of Japanese Patent Application Laid-open No. 1-126885, in a periphery of a mounting portion of a rear portion of an engine, a mounting member is joined to a rising portion of a tunnel of a floor panel in a longitudinal direction of the vehicle, a mounting portion which supports an end of the engine is provided on this mounting member, and an outrigger is mounted on a position crossing the mounting portion such that the outrigger extends between the mounting member and the side member (side frame), and loads applied to various portions are reduced.

According to an engine rear mount structure of Japanese Patent Application Publication No. 60-48361, a connecting member which is a separate member from a cross member is provided between both sides of a tunnel of a floor panel, the connecting member is rigidly connected to lower ends of bolts on both sides of the tunnel in the widthwise direction of the vehicle, and the connecting member is supported such that it is sandwiched between a head of a bolt and a mount insulator which supports a transmission that is integral with the engine on a cross member in an axial direction of the vehicle.

In the case of the structure in which the rear mount member 115 is mounted on the lower portions of the side frames disposed on both sides of the vehicle in its widthwise direction, there is a problem that the length of the rear mount member 115 is increased, the weight thereof is also increased and its rigidity is deteriorated.

In the case of a vehicle requiring high off-road performance, target values of the ground height (road clearance) and the lamp brake over angle are high. Therefore, in the case of the off-road vehicle, it is necessary to set the ground height at a high level.

When the rear mount member is fixed to the side frames, however, as shown with two-dot-chain lines that are added to FIG. 4 of the invention, at least the rear mount member 115 is disposed below the vehicle lower than the side frames by the height h. Therefore, the ground height is reduced. In order to secure the ground height, there exist some measures, e.g., the side frames are moved upward with respect to the vehicle, but there are problems that a living space in the passenger room becomes narrow correspondingly and a vehicle barycenter becomes high, and it is desired to improve the structure.

That is, in the conventional technique, since the rear mount member is fixed to the side frames, the length of the rear mount member is increased in the widthwise direction of the vehicle, and the weight of the rear mount member is increased. Further, since the length of the rear mount member is increased and its rigidity is low, a floating structure which fastens the rear mount member such that a vibration is not propagated to a floor panel through a rubber bush is merely employed.

In the case of the off-road vehicle, it is necessary to set the ground height at a high level. Since the rear mount member is fixed to the side frames, at least the rear mount member is disposed below the vehicle lower than the side frames. Thus, a layout of the vehicle in the vertical direction is limited due to a relation of the ground height, and there is a problem that the design flexibility is deteriorated.

SUMMARY OF THE INVENTION

Hence, it is an object of the present invention to provide a rear mount structure of an engine which increases the ground height (road clearance) of a vehicle and which reduces a vibration transmitted from a rear mount of the engine to a vehicle body.

The present invention provides a rear mount structure of an engine in which a pair of left and right side frames are mounted on a lower surface of a floor panel, a tunnel projecting between left and right seats disposed above the floor panel is formed in the floor panel, a transmission connected to the engine is disposed in the tunnel, the transmission is supported by a rear mount member through a rear mount, and both ends of the rear mount member in a widthwise direction of the vehicle are connected to a member disposed below the floor panel. A pair of left and right seat rails extend in the longitudinal direction of the vehicle in parallel to each other and are mounted on lower portions of the left and right seats, a seat front member and a seat rear member are connected to each other through the pair of left and right seat rails, the seat front member and the seat rear member are disposed on an upper surface of the floor panel.

An outer end of a bracket is joined to the side frame and an upper end of the bracket is joined to the floor panel. The bracket is disposed on a region where a vehicle longitudinal direction thereof is sandwiched between the seat front member and the seat rear member as viewed from above the vehicle. A lower surface of the bracket is disposed higher than a lower surface of the side frame, and the rear mount member is rigidly coupled to a lower surface of the bracket through a bolt.

According to the rear mount structure of the engine of the present invention, it is possible to increase the ground height of a vehicle and to reduce a vibration transmitted from a rear mount of the engine to a vehicle body.

DETAILED DESCRIPTION OF THE INVENTION

According to the present invention, a bracket for fixing a rear mount member is welded to a region which is surrounded by a side surface of a side frame, a seat rail of a floor panel and a seat member so that rigidity of the region is enhanced, and the height of the bracket is changed, thereby realizing targets, i.e., increase in the ground height of the vehicle, and reduction of a vibration transmitted from a rear mount of an engine to a vehicle body.

Figure 1:
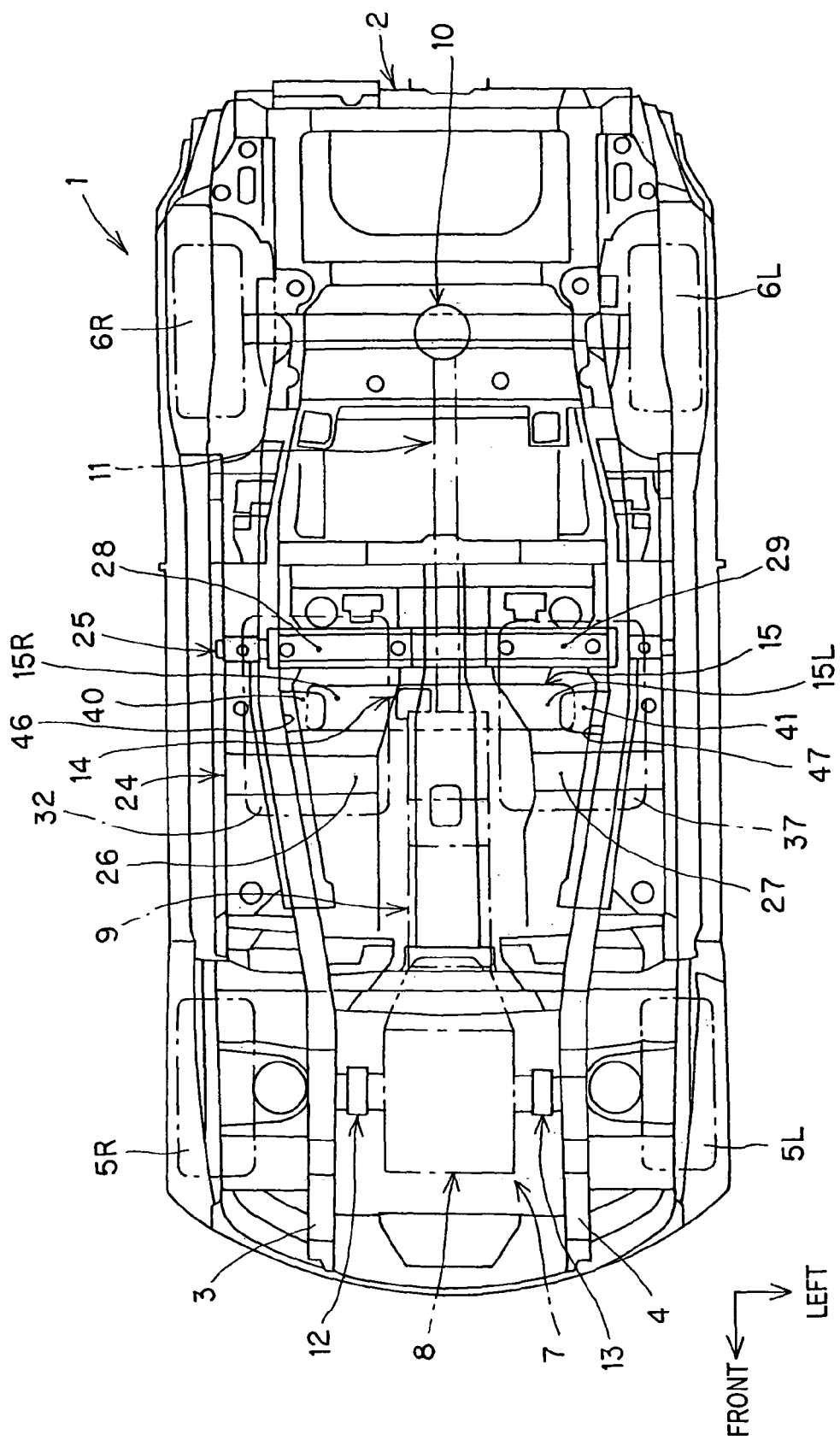
FIG. 1 is a schematic plan view of a vehicle.

In FIG. 1, a vehicle 1 includes a vehicle body 2, a right side frame 3 (floor main frame) that is one of a pair of left and right side frames, a left side frame 4 (floor main frame) that is the other one of the pair of left and right side frames, a right front wheel 5R, a left front wheel 5L, a right rear wheel 6R, and a left rear wheel 6L. The right side frame 3 and the left side frame 4 constitute the vehicle body 2.

Figure 2:
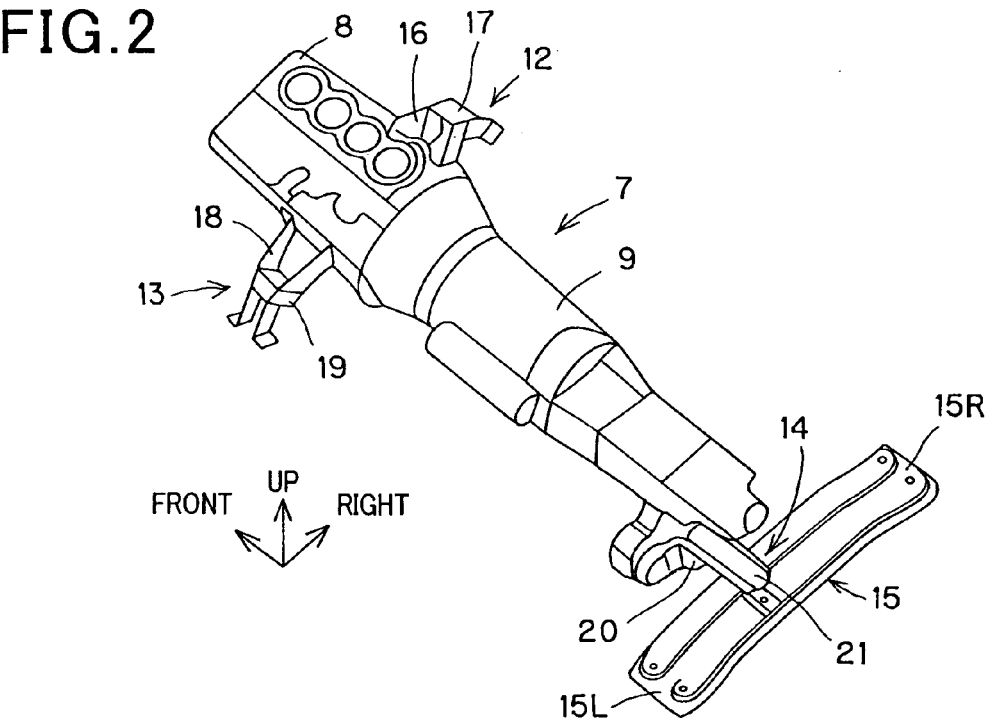
FIG. 2 is a perspective view of a power train.

As shown in FIGS. 1 and 2, a power train 7 is disposed between the right side frame 3 and the left side frame 4. In the power train 7, a longitudinal engine 8 and a transmission 9 connected to the engine 8 are integrally formed, and the power train 7 is supported by the right side frame 3 and the left side frame 4 in a so-called pitch mount type arrangement. A propeller shaft 11 which extends rearward of the vehicle and which is connected to a rear differential gear 10 is connected to a rear end of the transmission 9.

According to the pitch mount type arrangement for supporting the power train 7, a right side of the engine 8 is supported by the right side frame 3 through a right mount portion 12, a left side of the engine 8 is supported by the left side frame 4 through a left mount portion 13, and a rear end of the transmission 9 is supported by a rear mount member 15 through a rear mount portion 14.

The right mount portion 12 includes a right bracket 16 and a right mount 17. The left mount portion 13 includes a left bracket 18 and a left mount 19. The rear mount portion 14 includes a rear bracket 20 and a rear mount 21.

Figure 3:
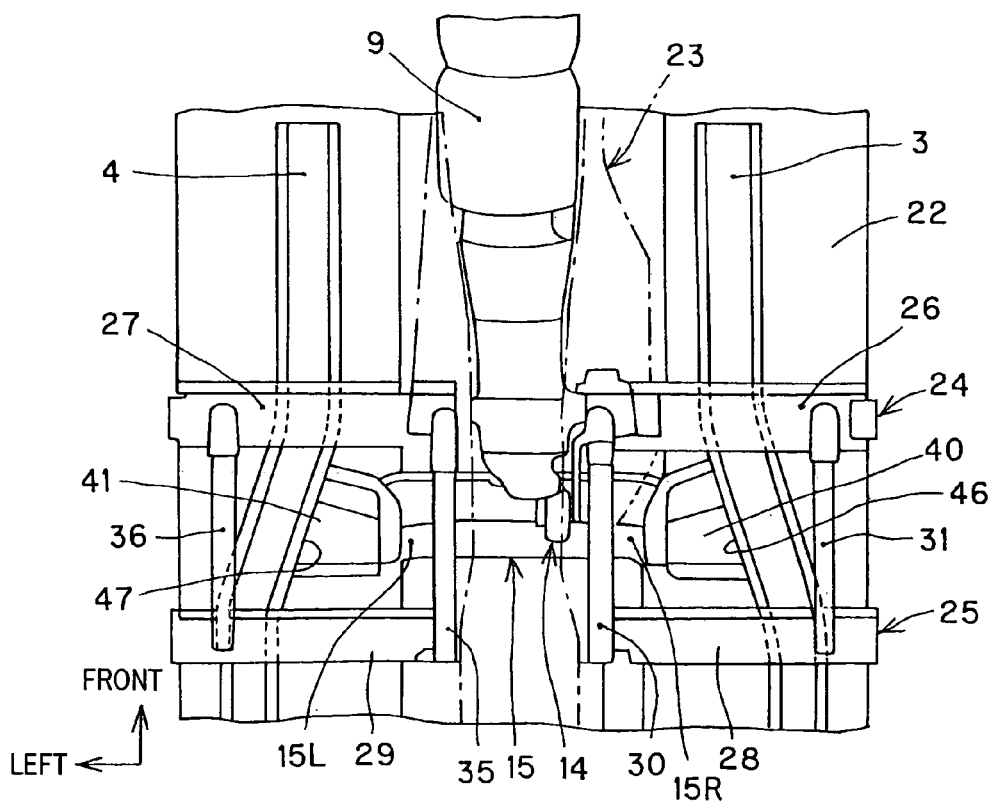
FIG. 3 is a perspective plan view of a rear mount structure of the vehicle.
Figure 4:
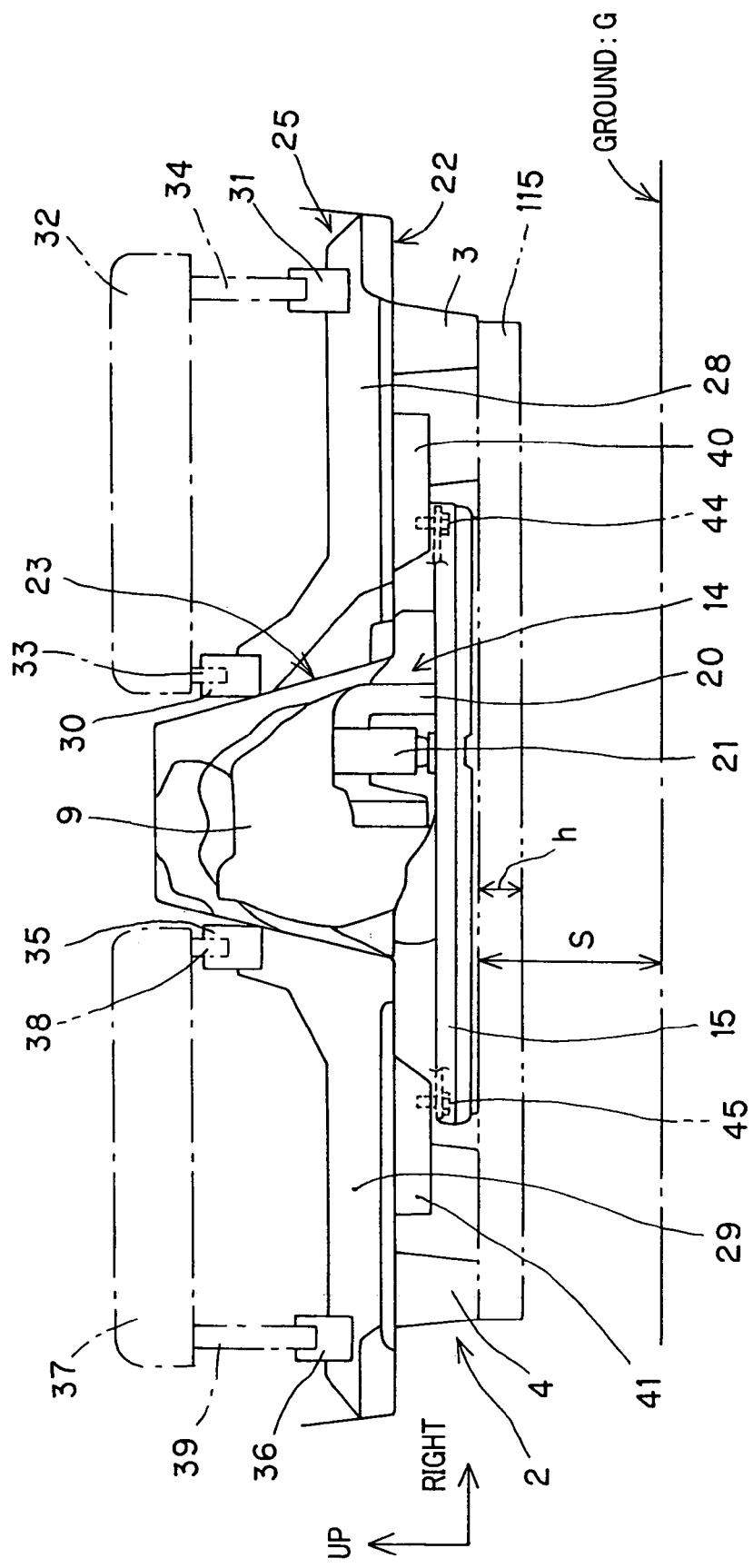
FIG. 4 is a perspective rear view of a rear mount as viewed from back of the vehicle.

As shown in FIGS. 1, 3 and 4, a floor panel 22 is disposed on upper surfaces of the right side frame 3 and the left side frame 4. A lower surface of the floor panel 22 is mounted on upper surfaces of the right side frame 3 and the left side frame 4.

A tunnel 23 projects upward from the floor panel 22 in a longitudinal direction of the vehicle such that at least part of the power train 7 is disposed therein.

A front seat front member 24 which is a seat front member and a front seat rear member 25 which is a seat rear member are disposed on the right side frame 3 and the left side frame 4 through the floor panel 22 such as to extend in parallel to the widthwise direction of the vehicle. Thus the front seat front member 24 and the rear seat rear member 25 are each disposed on both sides of the tunnel 23.

The front seat front member 24 includes a right front seat front member 26 located between the right side frame 3 and a right portion of the tunnel 23, and a left front seat front member 27 located between the left side frame 4 and a left portion of the tunnel 23.

The front seat rear member 25 includes a right front seat rear member 28 located between the right side frame 3 and the right portion of the tunnel 23, and a left front seat rear member 29 located between the left side frame 4 and the left portion of the tunnel 23.

As shown in FIGS. 3 and 4, a right inner seat rail 30 and a right outer seat rail 31 extending in parallel to the longitudinal direction of the vehicle are mounted on the right front seat front member 26 and the right front seat rear member 28. A right inner seat leg 33 and a right outer seat leg 34 of the right seat 32 are provided on the right inner seat rail 30 and the right outer seat rail 31 such that the legs 33 and 34 can move in the longitudinal direction of the vehicle.

A left inner seat rail 35 and a left outer seat rail 36 which extend in parallel to the longitudinal direction of the vehicle are mounted on the left front seat front member 27 and the left front seat rear member 29. A left inner seat leg 38 and a left outer seat leg 39 of the left seat 37 are provided on the left inner seat rail 35 and the left outer seat rail 36 such that the legs 38 and 39 can move in the longitudinal direction of the vehicle.

With this structure, the right seat 32 and the left seat 37 are disposed above the floor panel 22 as shown in FIG. 4. The tunnel 23 projects between the right seat 32 and the left seat 37. The transmission 9 is disposed in the tunnel 23.

The front seat front member 24 and the front seat rear member 25 extend in parallel to each other in the widthwise direction of the vehicle. The front seat front member 24 and the front seat rear member 25 are connected to each other through the pair of right seat rails 30 and 31 and the left seat rails 35 and 36 mounted on the lower portions of the pair of right seat 32 and left seat 37. The front seat front member 24 and the front seat rear member 25 are disposed on the upper surface of the floor panel 22.

As shown in FIG. 3, both ends 15R and 15L of the rear mount member 15 in the widthwise direction of the vehicle are connected to the right side frame 3 and the left side frame 4 through fixing right bracket 40 and left bracket 41 as members disposed below the floor panel 22.

Figure 5:
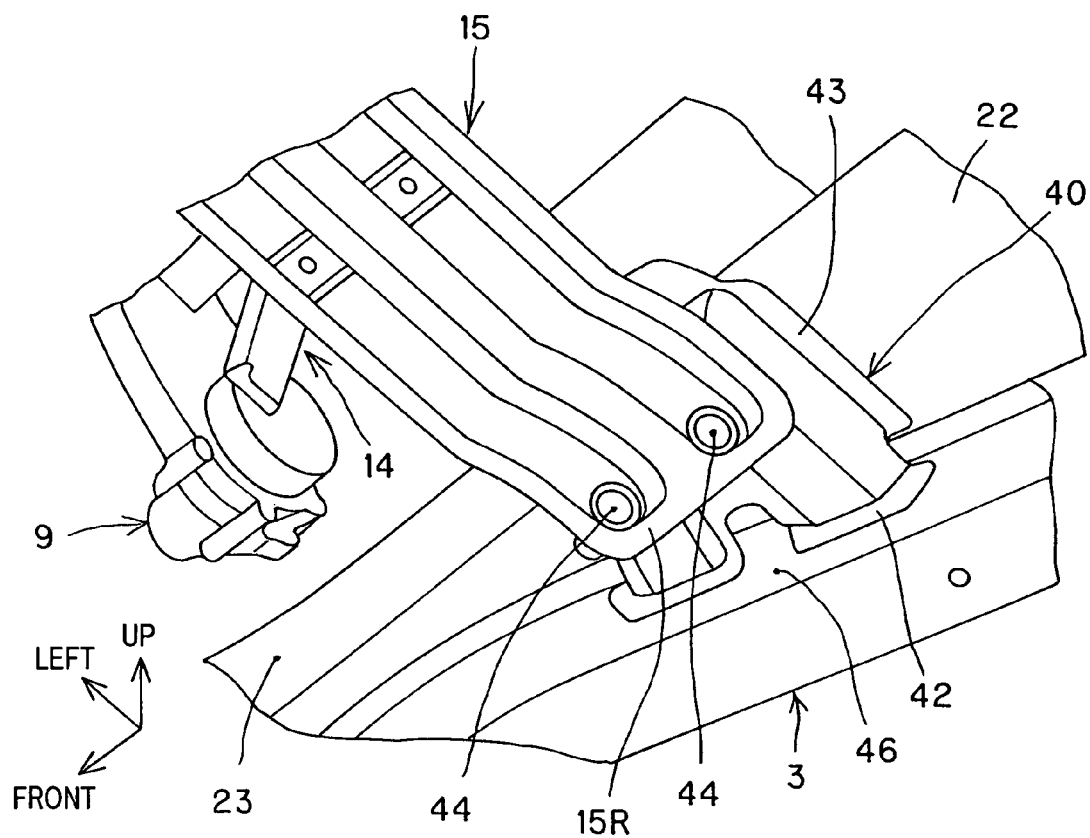
FIG. 5 is a perspective view of a rear mount structure as viewed from below the vehicle.
Figure 6:
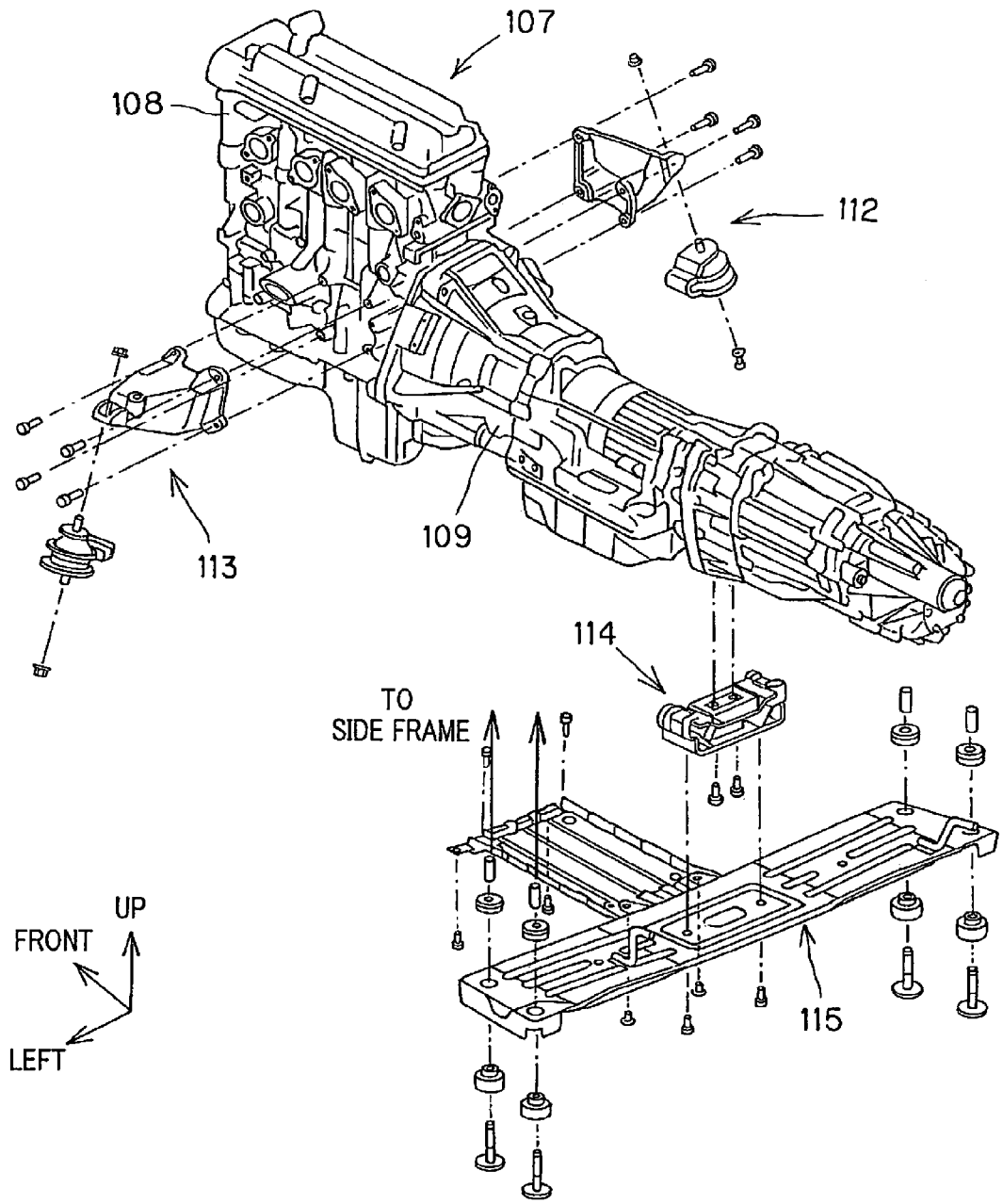
FIG. 6 is a perspective view of a conventional power train and a conventional rear mount structure.

As shown in FIG. 5, an outer end 42 of the right bracket 40 is coupled to the right side frame 3 through welding or the like, and an upper end 43 of the right bracket 40 is coupled to a lower surface of the floor panel 22 through welding or the like. The right bracket 40 is disposed in a region where the vehicular longitudinal direction of the right bracket 40 is sandwiched between the seat front member 24 and the seat rear member 25 as viewed from above of the vehicle.

As shown in FIGS. 4 and 5, a lower surface of the right bracket 40 is disposed higher than a lower surface of the right side frame 3. Both the ends 15R and 15L of the rear mount member 15 are rigidly coupled to lower surfaces of the right bracket 40 and the left bracket 41 through pairs of right bolts 44, 44 and left bolts 45, 45.

Since the left bracket 41 mounted on the left side frame 4 is constituted in the same manner as the right bracket 40, explanation thereof will be omitted.

In such a rear mount structure, the seat front member 24 and the seat rear member 25 extend in the widthwise direction of the vehicle in parallel to each other. The seat front member 24 and the seat rear member 25 are connected to each other through the pair of right seat rails 30, 31, and the left seat rails 35, 36 mounted on the lower portions of the left and right seats 32, 37. The seat front member 24 and the seat rear member 25 are disposed on the upper surface of the floor panel 22. An outer end 42 and an upper end 43 of the brackets 40, 41 are joined to the side frames 3, 4 and to the floor panel 22, respectively. The brackets 40, 41 are disposed in a region whose longitudinal direction of the vehicle is narrowed between the seat front member 24 and the seat rear member 25 as viewed from above of the vehicle. Lower surfaces of the brackets 40, 41 are set higher than the lower surfaces of the side frames 3, 4. The rear mount member 15 is rigidly coupled to the lower surface of the brackets 40, 41 through pairs of right bolts 44, 44 and left bolts 45, 45.

As a result, by setting the brackets 40, 41 at the predetermined values, the position of the rear mount member 15 can be made high as shown in FIG. 4 as compared with a case where both ends 15R, 15L of the rear mount member 15 are connected to the lower surfaces of the side frames 3, 4 and the ground height or road clearance (road clearance: height from the ground G to the lower surface of the vehicle body 2) S can be increased as compared with the conventional technique. Further, as compared with a case where both the ends 15R, 15L of the rear mount member 15 are connected to the lower surfaces of the side frames 3, 4, the entire length of the rear mount member 15 can be shortened, the rigidity can be enhanced and a vibration of the rear mount member 15 itself can be prevented. Further, the rear mount structure can be made light in weight and small in size. At that time, the brackets 40, 41 which support the respective ends 15R, 15L of the rear mount member 15 are sandwiched between the seat front member 24 and the seat rear member 25 between the side frames 3, 4 and the floor panel 22, and are joined to a region having higher rigidity than other portions, and both ends 15R, 15L of the rear mount member 15 are rigidly coupled to the brackets 40, 41 by the pair of bolts 44, 44. Therefore, it is possible to suppress the vibrations of the brackets 40 and 41, and to reduce the vibration of the floor panel 22. Further, by changing the height of the brackets 40 and 41, the rear mount member 15 can be disposed above the vehicle 1 at a location higher than the side frames 3 and 4, and it is possible to enhance the off-road performance and aerodynamic performance.

In the conventional technique, since the rear mount member is fixed to the side frame, the length of the rear mount member is increased in the widthwise direction of the vehicle, and the weight of the rear mount member is increased. Further, since the length of the rear mount member is increased and its rigidity is reduced, the rear mount member is fastened through a rubber bush so that a vibration is not transmitted to the floor panel. This structure is called a floating structure.

In the embodiments of the invention, the fixing brackets 40, 41 of the rear mount member 15 are welded to the side frames 3, 4 and the floor panel 22 at a location surrounded by the right seat rails 30 and 31, the left seat rails 35 and 36, the seat members 26, 27, 28 and 29 where the rigidity is high. By setting the heights of the brackets 40, 41 and the like, it is possible to shorten the length of the rear mount member 15 in the widthwise direction of the vehicle, and the rear mount member 15 can be reduced in weight and size. If the rear mount member 15 becomes compact, the rigidity of the rear mount member 15 itself is enhanced. Therefore, solid fixing by which the rear mount member 15 can be fastened directly to the brackets 40, 41 can be realized, and costs can be reduced.

In the case of the off-road vehicle, it is necessary to set the ground height at a high value. In the conventional technique, since the rear mount member is fixed to the lower surface of the side frames, at least the rear mount member is disposed below the vehicle a distance lower than the side frames. Therefore, the layout of the vehicle in the vertical direction is limited, and design flexibility is poor due to the relation of the ground height.

In the embodiments of the invention, on the other hand, the design flexibility of the vehicle in the vertical direction is enhanced by changing the heights of the brackets 40 and 41, and the rear mount member 15 can be disposed at a high position, and the off-road performance is enhanced. Further, since the design flexibility is enhanced, the shape of the rear mount member 15 can be ideally designed. Further, since the rear mount member 15 can be disposed at a higher position than the side frames 3 and 4, aerodynamic performance can be enhanced.

As shown in FIGS. 1 and 3, a right inclined portion 46 and a left inclined portion 47 which are inclined inward in the widthwise direction of the vehicle from the longitudinal direction of the vehicle are formed on the side frames 3, 4 between the seat front member 24 and the seat rear member 25 as viewed from above the vehicle. The brackets 40, 41 are mounted on the right inclined portion 46 and the left inclined portion 47 of the side frames 3, 4.

With this arrangement, it is possible to bring the brackets 40, 41 joined to the side frames 3, 4 closer to the rear mount member 15 by the right inclined portion 46 and the left inclined portion 47 of the side frames 3, 4, and a vibration transmitted from the transmission 9 to the side frames 3, 4 can be reduced.

The rear mount structure of the engine according to the present invention can be applied to various kinds of vehicles.

What is claimed is:

1. A rear mount structure of an engine in which a pair of left and right side frames are mounted on a lower surface of a floor panel, a tunnel projecting between left and right seats disposed above the floor panel is formed in the floor panel, a transmission connected to the engine is disposed in the tunnel, the transmission is supported by a rear mount member through a rear mount, and both ends of the rear mount member in a widthwise direction of the vehicle are connected to a member disposed below the floor panel, wherein a pair of left and right seat rails extend in the longitudinal direction of the vehicle in parallel to each other and are mounted on lower portions of the left and right seats, a seat front member and a seat rear member are disposed in parallel to each other and are connected to each other through the pair of left and right seat rails, the seat front member and the seat rear member are disposed on an upper surface of the floor panel, an outer end of a bracket is joined to the side frame and an upper end of the bracket is joined to the floor panel, the bracket is disposed on a region wherein, in a vehicle longitudinal direction thereof, the bracket is sandwiched between the seat front member and the seat rear member, with a lower surface of the bracket disposed a higher distance than a lower surface of the side frame, and the rear mount member is rigidly coupled to a lower surface of the bracket through a bolt.

2. The rear mount structure of the engine according to claim 1, wherein an inclined portion which is inclined inward in the widthwise direction of the vehicle from the longitudinal direction of the vehicle is formed on the side frame between the seat front member and the seat rear member, and the bracket is mounted on the inclined portion of the side frame.

* * * * *